PULSE CODE SYSTEM

Filed March 16, 1948

INVENTOR.
ANDRÉ G. CLAVIER
BY
R P Morris
ATTORNEY

Patented Aug. 29, 1950 2,520,125

UNITED STATES PATENT OFFICE 2,520,125

PULSE CODE SYSTEM

André G. Clavier, Nutley, N. J., assignor to International Standard Electric Corporation, New York, N. Y., a corporation of Delaware Application March 16, 1948, Serial No. 15,081

10 Claims. (Cl. 332—11)

This invention relates to systems for converting amplitude modulated pulse signals into signals modulated in accordance with a given pulse code and more particularly to such conversion systems utilizing frequency modulation as the translating medium.

It is known to convert signals modulated in accordance with a significant pulse amplitude into pulse code modulation. Ordinarily, pulse code modulation systems utilize the factor of amplitude to obtain a translation from amplitude into code modulation, directly or indirectly. In connection with the operation of such systems an important consideration arises which has for its purpose the operative stabilization of the overall system.

It has been found that such stabilization can be made far more effective if the medium utilized for translating from one mode of modulation into another mode is frequency rather than amplitude.

It is an object of the present invention to provide a system for converting pulse amplitude into pulse code modulation using frequency modulation as a translating medium.

It is another object to provide a pulse code modulation converting system wherein the two quantities which are being periodically compared for the purpose of obtaining pulse code determining voltages are frequencies, one a function of the amplitude modulated pulses, and the other of a factor varying in time as an exponentially varying characteristic.

In accordance with certain features of the invention, I provide a system for periodically comparing two frequencies of which one is a function of the pulse amplitude signal to be converted and the other a function of a locally generated modulating voltage varying in accordance with an exponentially decaying characteristic and of the relative frequency difference as obtained from the preceding periodic comparison. More particularly the pulse amplitude signal is converted into a frequency function, the frequency being linearly related to the modulating amplitude. Another locally generated frequency is modulated cyclically by means of a so-called weighing signal which has an exponentially decaying amplitude characteristic and which is applied to modulate the second frequency in such a way that increments of frequency are added to said source in accordance with the time at which they are applied and in accordance with the result of the comparison of the two basic frequencies which has taken place in the prior period.

In accordance with another feature the two basic frequencies are periodically compared and the resultant employed for stabilizing the relationship between these two frequencies.

These and other objects and features of the invention will become more apparent and the invention itself, though not necessarily defined by said features and objects, will be more clearly understood by reference to the following description of an embodiment of the invention taken in connection with the accompanying drawings wherein.

Figures 1, 2, 3:
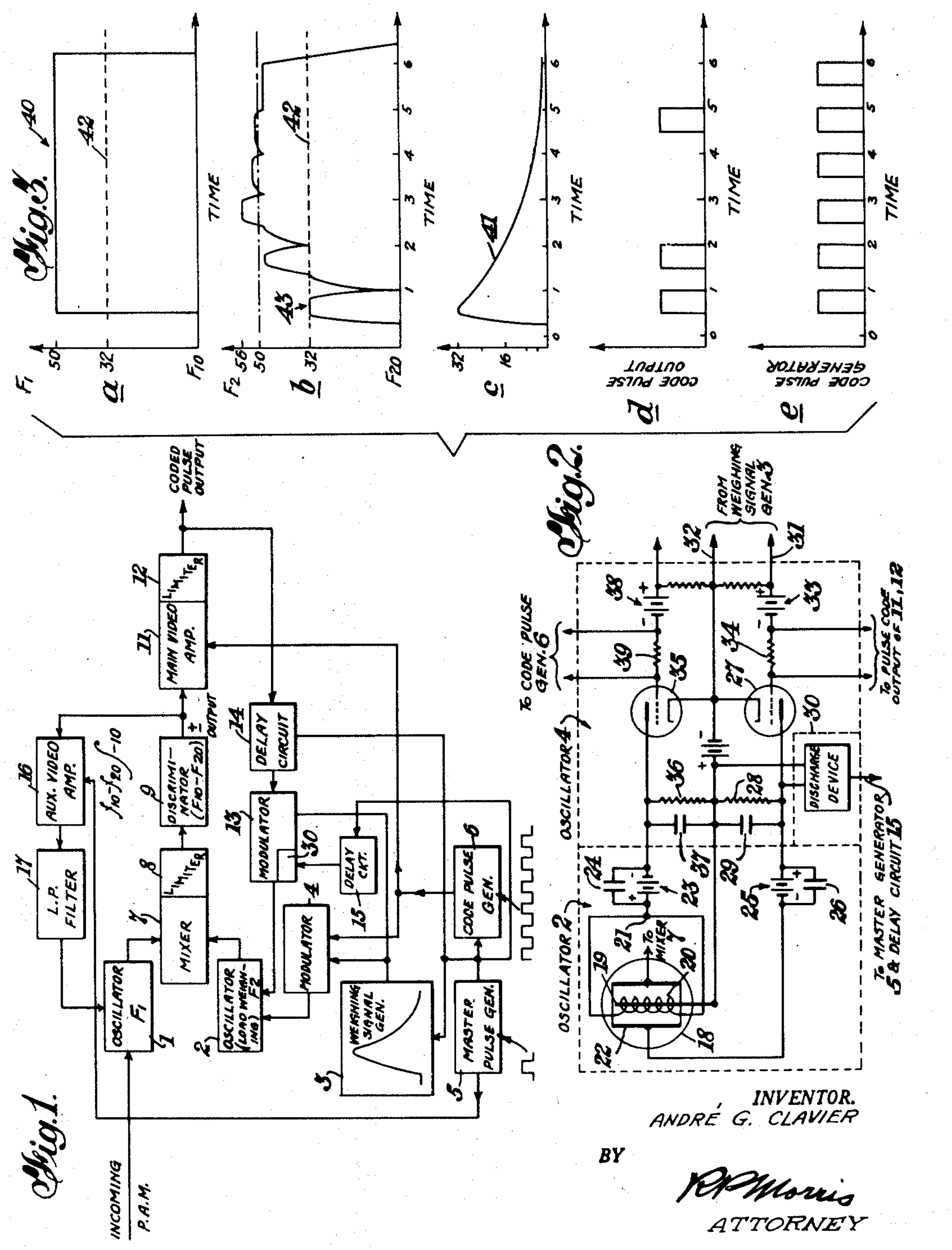
Fig. 1 is a diagram in block form of a pulse code conversion system in accordance with the invention.
Fig. 2 is a diagram in schematic form of the local weighing oscillator of the system of Fig. 1.
Fig. 3 is a series of graphs illustrating certain operative conditions of the system of Fig. 1.

Referring to the above drawings the system shown in Fig. 1 includes an oscillator 1 which is a source for providing a basic frequency designated at $F_1$. This oscillator includes means for converting incoming pulse amplitude modulations into linearly corresponding frequency modulations for instance by means of a reactance tube type modulator. However, any other suitable device for converting from amplitude into frequency may be used. At 2, there is shown a second oscillator which is productive of another basic or primary frequency indicated as $F_2$. This second oscillator has the function of acting as a local weighing oscillator. The oscillator 2 is capable of being modulated in respect to frequency and itself is preferably of the type shown in Fig. 2. This type oscillator is known as the positive grid type oscillator and will be discussed in greater detail in connection with the second figure. In order to provide suitable modulating voltages for the weighing oscillator a weighing signal generator is provided as at 3. The output of the generator 3 is such as to vary in accordance with the function $e^{-a\Delta t}=\frac{1}{2}$, that is to say an exponentially decaying characteristic wherein the effective ordinate declines ½ of the previous value at given intervals of the abscissa. The output of the weighing signal generator 3 is applied to the oscillator 2 by way of a modulator 4. In order to establish a timing base for the operation of the system I provide a master pulse generator shown at 5 which is the source of a periodic synchronizing pulse applied to various portions of the system as will appear hereinbelow.

One such portion synchronized by the generator 5 is a code pulse generator 6 which is productive of the desired number of code pulses in response to each synchronizing pulse chosen, in the example used, six pulses for each cycle. To obtain a comparison of the two basic frequencies $F_1$ and $F_2$, the two oscillators 1 and 2 have their output combined in a mixer circuit 7 which through a suitable limiter circuit 8 feeds into a frequency discriminator 9. The discriminator 9 is preferably tuned to a predetermined value of the difference between $F_{10}$ and $F_{20}$, that is of the unmodulated values of $F_1$ and $F_2$. The voltage response with change in frequency of the circuit 9 is shown at 10. The output energy of the discriminator 9 is negative or positive in accordance with the relative magnitudes of $F_1$ and $F_2$ and is fed into a video amplifier 11, which is periodically gated under control of code pulse generator 6. Thus the output of the amplifier 11 will be a series of pulses of variable amplitude, either positive or negative in accordance with the output of the discriminator 9. By passing the output of the amplifier 11 through a threshold circuit 12 the negative pulses are eliminated and there remain only a group of positive pulses of constant amplitude which represent the desired coded pulse output corresponding to the original amplitude modulated pulse input.

The control of the application of the modulating voltage of the generator 3 with respect to the oscillator 2 is obtained by feeding back the output of the threshold circuit 12 to the oscillator 2 through the medium of a modulator 13 after being delayed in a delay circuit 14. Modulator 13 serves as a control for the application of the weighing signal generator output voltage as it is applied to the oscillator 2. The modulator 13 is also periodically controlled by means of a synchronizing pulse from the pulse generator 5 over a delay circuit 15. A stabilizing control over the relationship between the two basic frequencies $F_1$ and $F_2$ is provided in the form of a control feedback from the discriminator 9 to oscillator 1 in the form of a positive or negative voltage. This feedback takes place intermediate the periods of the modulated frequency comparison as determined by the synchronized pulse from the master pulse generator 5 which acts to energize or to gate an auxiliary video amplifier 16 receiving the output of the discriminator 9 and feeding into an associated low-pass filter 17. As the relationship between two basic non-modulated frequencies varies, the output of the discriminator will result in differential voltages, the polarity of which will depend on the relative value of the two frequencies and which is fed back to the oscillator 1 in order to reestablish the said predetermined relationship by modifying frequency F.

Having reference to the schematic showing in Fig. 2, the preferred circuit for the oscillator 2 comprises a positive grid tube 18. For a detailed treatment of the theory of operation of this type of oscillator reference may be had to U. S. Patent No. 1,987,989. The tube 18 is made up of a central filament 19, a helicoidal grid 20 which builds up the oscillator circuit and to which a voltage is applied to point 21 symmetrical to the two terminals thereof. The third electrode is comprised of a cylindrical plate 22 which is coaxial with the filament and grid. A source of potential indicated at 23 supplies a positive bias to the grid applied at the point 21, a condenser 24 serving as a high frequency shunt therefore. Another source of potential 25 supplies a negative bias to the plate 22, condenser 26 serving as a high frequency shunt. The battery required for the filament has not been shown. The tube 18 has in effect two modulating electrodes the negatively biased plate having a high impedance is modulated from a tube 27 which includes in its circuit a resistance 28 having a comparatively high value. When tube 27 is conducting a voltage is applied to a time constant circuit in shunt with the tube consisting of a condenser 29 shunting resistance 28. The voltage first applied to the condenser will remain there until the coding cycle has been completed. Upon completion of such a cycle resistance 28 is short circuited by a discharge device 30, which may comprise an electron discharge tube under control of a synchronizing pulse from the master pulse generator 5 by way of the delay circuit 15. The modulator tube 27, which forms a part of the modulator 13 of Fig. 1, is rendered conductive by means of a voltage from the weighing signal generator 3 applied over the leads 31 and 32 under the control of code pulses in the output of the threshold circuit 12. Conduction of the tube 27 takes place only if the negative bias from a source 33 is overcome by a positive voltage due to code pulses from the threshold circuit 12 applied to a grid circuit resistance 34.

The second control electrode, that is the grid 20 of tube 18 has a low impedance which has a modulating voltage impressed thereon by means of a tube 35. The tube 35, which is part of the modulator 4 of Fig. 1 includes in its circuit a comparatively small resistance 36 shunted by a condenser 37 constituting a low time circuit as compared to the large time circuit associated with the tube 27. When the tube 35 is rendered conductive, condenser 37 is charged from signal generator 3 whenever a code pulse from generator 6 is present. At such a time the negative bias due to a source 38 is counteracted by means of a positive voltage which becomes effective across grid circuit resistance 39 as obtained from the code pulse generator 6. During intervals between code pulses tube 35 is non-conductive and condenser 37 will discharge quickly through the small resistance 36.

In operating the above system a first comparison will be made between the incoming pulse amplitude modulated signal applied to determine the frequency of oscillator 1 and the output of the auxiliary oscillator 2 during the first code pulse obtained from the generator 6. Having reference now to the graphs in Fig. 3, graph *a* indicates the character of the pulse amplitude modulated signal in the form of a pulse 40. Thus, pulse 40 represents both the amplitude value of the applied pulse as well as the corresponding variation in the frequency $F_1$ of the oscillator 1. Graph *b* represents the composite output voltage of the oscillator 2 obtained as a result of the modulating voltages applied to the two controlling electrodes thereof over modulators 13 and 4 during each of the 6 code pulses of generator 6 in graph *e*. Graph *c* illustrates the characteristic of the output voltage of the weighing signal generator 3 showing an exponentially decaying curve 41 which during intervals from one pulse to the next of the generator 6 decreases in amplitude by ½ of the previous value. Thus, if the applied pulse 40 has an equivalent weight of 50 as shown in graph *a* and in view of the 6 element code used in this example the maximum weight level is 64, half of the maximum level, which is the maximum amplitude of the curve 41 with reference to which the first comparison is made would be at 32 as indicated by the broken line 42 in graphs a and b. As the first code pulse from generator 6 renders the modulator 4 conductive, the modulating voltage at that time available from the generator 3, which has the weight of 32 in accordance with graph c is applied to the low impedance grid 20 over the small time constant circuit 36 and 37 whereby a fairly rapid maximum voltage value is attained with respect to the grid 20 as indicated at 43 (graph b). The frequencies thus obtained from oscillators 1 and 2 are compared in the mixer circuit 7 and the difference converter into voltage amplitude in the discriminator 9. If the frequencies are related as indicated in graphs a and b, $F_1$ is larger than $F_2$ with the consequence that a positive output will be obtained from the discriminator 9 and a code pulse is obtained from the threshold circuit 12. Should, however, frequency $F_1$ be less than the frequency $F_2$ of the oscillator 2 the resultant negative output of the discriminator 9 will not be productive of any pulse code in the threshold circuit 12. In the example shown, the weight of the first corresponding code pulse is therefore 32 which occurs only in the case when the 6 element code has been chosen. The code pulse thus obtained is fed back through the delay circuit 14 and the modulator 13, that is the tube 27 (Fig. 2) to electrodes 20 and 22 whereby subsequent to the occurrence of the said first code pulse the resultant frequency of the oscillator 2 is maintained at the value it had during the duration of the first code pulse. This action, however, is slightly delayed through the medium of the circuit 14 so as not to begin during the occurrence of the said first code pulse. The process is such that the comparison of the two basic frequencies for the second code pulse will be made at a frequency increased by the weight 16, that is an amount which is required for the binary type of weighing. The operation explained for the first code pulse will then repeat itself and thereby result in a correct coding result. The application of the 32 weight pulse code to the high impedance control electrode 22 will result in the maintenance of the corresponding level voltage thereon until the termination of the coding pulse cycle. It must, of course, be kept in mind that the effect of the two central electrodes in tube 18 is such that there exists a definite relationship in respect to the conversion of the applied voltage to the output frequency in accordance with the specification in the above-identified U. S. patent.

A second frequency comparison occurs as the second code pulse is supplied from the generator 6. At this time the oscillator 2 is adjusted to a level of 32+16=48 (graph b). The weight 48 is derived due to the simultaneous action of its two central electrodes, one acted on by the modulator 13 giving a weight of 32, and the other one acted on by the modulator 4 supplying the voltage then available from the generator 3 which has the weight of 16 (graph c). If, as is the case in this instance, the frequency $F_1$ which is of the weight 50 is larger than the frequency $F_2$ which has the weight 48, the process described in connection with the first code pulse repeats itself. The result is that a coded pulse is transmitted and the high impedance electrode will be pushed up in the subsequent interval to a weight corresponding to 48. Thus, the subsequent comparison will take place between the frequency corresponding to the supplied pulse amplitude signal and a frequency $F_2$ modulated to a level made up of weights 32+16+8=56.

In the case, however, that the pulse amplitude 40 is less than the 48 supplied by the oscillator 2 no pulse code is transmitted and the high impedance electrode will stay at the level 32 for the next comparison which will thus be made at a level 32+8=40. A correct binary weighing is thus achieved. For the weights selected in the illustrative example successive comparisons will thus take place at composite levels of 32, 48, 56, 52 and 50, the resultant transmitted core pulse signal being indicated in graph d. The transmitted pulses are the first, second and fifth pulse having the weight of 32, 16 and 2 respectively giving a total final weight of 50.

As already outlined the output of the discriminator 9 between the code pulses is utilized for holding stable the relationship between the two basic frequencies $F_1$ and $F_2$, an advantage which is attained with somewhat less difficulties than in systems used heretofore.

Any desired variation in the basic number of code pulses may be obtained by the change of the master pulse generator 5, the coding pulse generator 6 and the delay lines 15 and 14. The rest of the system need not be changed thus providing a system having great flexibility.

While I have described above the principles of my invention in connection with specific apparatus, it is to be clearly understood that this description is made only by way of example and not as a limitation on the scope of my invention.

I claim:

1. An electronic system for converting an amplitude modulated signal into binary code pulse indications, comprising means for supplying pulses modulated in amplitude in accordance with the amplitude variations of an audio signal, a first source for providing a voltage at a given primary frequency, first means for angularly modulating the said primary frequency as a substantially linear function of said amplitude modulated pulses, a second source for providing a voltage at another given primary frequency, said other frequency serving as a reference, means for providing a weighing signal for angularly modulating said other frequency, said weighing signal varying as a function of time, a second means for angularly modulating said other frequency controlled by said weighing signal means, means for periodically comparing the two modulated primary frequencies, and means responsive to said comparing means for obtaining binary pulse code indications of a given elemental number for each amplitude modulated pulse in accordance with the amplitude thereof.

2. A system according to claim 1, wherein said weighing signal means comprises a generator providing an exponentially decaying cyclical voltage.

3. An arrangement according to claim 1, wherein said comparing means comprises a circuit for mixing said two modulated primary frequencies and a frequency discriminator.

4. An arrangement according to claim 1, wherein said second source comprises a positive grid oscillator.

5. A system according to claim 4, wherein said positive grid oscillator comprises a high and a low impedance modulating electrode and a large and a small time constant circuit associated with said respective electrodes.

6. A system according to claim 1, wherein said second modulating means includes a first and a second modulator for applying voltages from said weighing signal means to said second source and means for controlling second modulator from said pulse code obtaining means.

7. A system according to claim 1, wherein said pulse code obtaining means comprises an amplifier and a threshold limiter circuit, a code pulse generator, and means for supplying energy from said comparing means and said code pulse generator to said amplifier and said threshold limiter.

8. A system according to claim 1, further including means for synchronizing the operation of the system including a master pulse generator and a code pulse generator energized thereby.

9. A system according to claim 1, further including means for stabilizing the relationship of said first and second primary frequencies, including feedback means from said comparing means to said first source.

10. An electronic system for converting an amplitude modulated signal into binary code pulse indications, comprising means for supplying pulses modulated in accordance with the amplitude variations of an audio signal, a first source for providing a voltage at a given primary frequency, first means for modulating said first primary frequency as a substantially linear function of such amplitude modulated pulses, a second source for providing a voltage at another given primary frequency including a positive grid oscillator, a signal generator for providing a weighing signal for modulating said other frequency, said weighing signal varying as a function of time, a master pulse generator for cyclically controlling the operation of the system, a pulse code generator for cyclically supplying elemenetal code pulses controlled from said master pulse generator, a circuit for mixing the two modulated primary frequencies, a frequency discriminator supplied from said mixing circuit for converting frequency into voltages substantially tuned to a given difference of the two primary differences, means for obtaining pulse code signals from said discriminator circuit including a threshold limiter controlled from said pulse code generator, means for applying a frequency modulating signal to said second source from said weighing signal generator including a first modulator controlled from said code pulse generator and a second modulator controlled from said master pulse generator including a delay circuit and controlled from said pulse code obtaining means including another delay circuit; and means for stabilizing a given relationship of said two primary frequencies including feedback means from said discriminator to said first source controlled by said master pulse generator.

ANDRÉ G. CLAVIER.

REFERENCES CITED

The following references are of record in the file of this patent:

UNITED STATES PATENTS

| Number | Name | Date |
|---|---|---|
| 2,438,908 | Goodall | Apr. 6, 1948 |

OTHER REFERENCES

Pages 392–409 of "Bell System Technical Journal," vol. 21, No. 3, dated July 1947.